US012676396B2

(12) United States Patent
Levingstone et al.

(10) Patent No.: US 12,676,396 B2
(45) Date of Patent: Jul. 7, 2026

(54) TRANSPARENT ANTENNA ASSEMBLY WITH FLEXIBLE TRANSPARENT ANTENNA

(71) Applicant: TAOGLAS GROUP HOLDINGS LIMITED, Enniscorthy (IE)

(72) Inventors: William Levingstone, Enniscorthy (IE); Vincent Hodnett, Enniscorthy (IE); Baha Badran, Enniscorthy (IE)

(73) Assignee: Taoglas Group Holdings Limited, Enniscorthy (IE)

( * ) Notice: Subject to any disclaimer, the term of this patent is extended or adjusted under 35 U.S.C. 154(b) by 171 days.

(21) Appl. No.: 18/581,007

(22) Filed: Feb. 19, 2024

(65) Prior Publication Data

US 2024/0283131 A1 Aug. 22, 2024

Related U.S. Application Data

(60) Provisional application No. 63/447,445, filed on Feb. 22, 2023.

(51) Int. Cl.

| | |
|---|---|
| ***H01Q 1/22*** | (2006.01) |
| ***H01Q 1/08*** | (2006.01) |
| ***H01Q 1/12*** | (2006.01) |
| ***H01Q 5/371*** | (2015.01) |
| ***H01Q 9/16*** | (2006.01) |

(52) U.S. Cl.
CPC ........... *H01Q 1/1271* (2013.01); *H01Q 1/085* (2013.01); *H01Q 1/2291* (2013.01); *H01Q 5/371* (2015.01); *H01Q 9/16* (2013.01)

(58) Field of Classification Search
CPC .... H01Q 1/085; H01Q 1/1271; H01Q 1/2291; H01Q 5/371; H01Q 9/16
See application file for complete search history.

(56) References Cited

U.S. PATENT DOCUMENTS

| | | | | |
|---|---|---|---|---|
| 6,252,550 B1 * | 6/2001 | Vernon | H01Q 1/38 | 343/742 |
| 2008/0122705 A1 * | 5/2008 | Kurashima | H01Q 1/242 | 343/702 |
| 2019/0348753 A1 * | 11/2019 | Song | H01R 24/50 | |

* cited by examiner

*Primary Examiner* — Daniel Munoz
(74) *Attorney, Agent, or Firm* — Garson & Gutierrez, PC

(57) ABSTRACT

A transparent antenna assembly and flexible transparent antenna. In one embodiment, the transparent antenna assembly includes a flexible transparent antenna having a transparent flexible substrate, the flexible transparent antenna being configured to operate according to a desired frequency band, the flexible transparent antenna including a portion that is configured to connect with a transparent substrate interface assembly; and a connector subassembly having a printed circuit board (PCB) mount connector, the PCB mount connector is configured to interface with the transparent flexible substrate via the transparent substrate interface assembly, the connector subassembly further including a radio frequency (RF) connector, the RF connector being in signal communication with the PCB mount connector.

15 Claims, 8 Drawing Sheets

TRANSPARENT ANTENNA ASSEMBLY WITH FLEXIBLE TRANSPARENT ANTENNA

PRIORITY

This application claims the benefit of priority to U.S. Provisional Patent Application Ser. No. 63/447,445 filed Feb. 22, 2023, entitled "Transparent Antenna and Transparent Antenna Connection Methodologies", the contents of which being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE DISCLOSURE

1. Technological Field

The present disclosure relates generally to transparent circuits, and more particularly in one exemplary aspect to transparent antennas as well as the providing of connection methodologies for the connection of these transparent antennas to underlying electronic circuitry such as radio frequency (RF) transceivers.

2. Field of the Disclosure

Traditionally, a flexible printed circuit board (FPCB), as its name implies, is a printed circuit board manufactured using an underlying substrate that is naturally flexible. For example, a typical FPCB is manufactured using a polyimide material having one or more layers of copper disposed thereon. FPCB's are advantageous in that they are flexible and can be disposed in a variety of applications in which, for example, a rigid circuit board may not be best utilized. FPCB's may also be secured to, for example, a soldered pigtail cable which provides an interface connection methodology for the underlying FPCB. More recently, a new variant of FPCB known as a transparent FPCB has been manufactured by companies such as, for example, CHASM™. These transparent FPCBs may be manufactured by printing proprietary inks formulated with conductive carbon nanotubes onto a metal mesh film. These transparent FPCB's are advantageous in that they are virtually transparent enabling their integration on, for example, automobile windshields. However, unlike traditional FPCBs the underlying substrate utilized for transparent FPCBs is not suitable for the sustained high temperature of typical soldering processes used on traditional FPCBs. Additionally, the use of transparent FPCBs introduces new challenges for the designer of these antennas due to the different operating scenarios in which these transparent FPCBs are deployed. For example, interface connections to these transparent antennas are themselves not transparent, making traditional connections to these antennas not desirable. Accordingly, new techniques are needed that address these new paradigms for incorporation of these transparent FPCBs into a wider array of applications.

SUMMARY

The present disclosure satisfies the foregoing needs by providing, inter alia, methods, apparatus and systems for the implementation of transparent FPCB antennas that address the deficiencies recognized above.

In one aspect, a transparent antenna is disclosed. In one embodiment, the transparent antenna includes a transparent flexible substrate having conductive artwork disposed thereon, the conductive artwork including a feed connection and a ground connection. The conductive artwork is configured to operate in accordance with a desired frequency band.

In one variant, the desired frequency band includes a global navigation satellite system (GNSS) frequency band.

In another variant, the feed connection includes a first dipole trace and the ground connection includes a second dipole trace, the second dipole trace being shorter in length than the first dipole trace.

In yet another variant, the first dipole trace is connected with a rectangular feed section, the rectangular feed section projecting in a direction that is orthogonal with a run direction for the first dipole trace.

In yet another variant, the rectangular feed section is connected with a rectangular conductor section, the rectangular conductor section being larger in dimension along the run direction for the first dipole trace as compared with a dimension for the rectangular conductor section that runs in a direction that is orthogonal with the run direction for the first dipole trace, the rectangular conductor section further including a notched section that is disposed at an interface region between the rectangular feed section and the rectangular conductor section.

In yet another variant, the desired frequency band comprises a cellular frequency band.

In yet another variant, the feed connection includes a first dipole trace, the first dipole trace being connected with a horizontal projection conductor section and a vertical projection conductor section, the horizontal projection conductor section being positioned orthogonal with the vertical projection conductor section, the first dipole trace further being connected with an angled projection conductor section that is disposed at an interface region between the horizontal projection conductor section and the vertical projection conductor section.

In yet another variant, the angled projection conductor section is connected with a meandering conductor section at an end of the angled projection conductor section that is opposite from the interface region between the horizontal projection conductor and the vertical projection conductor section.

In yet another variant, the ground connection includes a second dipole trace, the second dipole trace being connected with a sixth rectangular conductor section followed by a seventh rectangular conductor section, the sixth rectangular conductor section being disposed between the second dipole trace and the seventh rectangular conductor section, the seventh rectangular conductor section being horizontally offset from the sixth rectangular conductor section, the sixth rectangular conductor section also being disposed adjacent the first dipole trace.

In yet another variant, an angled conductor section is connected with the sixth rectangular conductor section, the angled conductor section also being connected with an eighth rectangular conductor section on one end of the angled conductor section, the angled conductor section also being connected with a ninth rectangular conductor section on an opposing end of the angled conductor section opposite from the one end of the angled conductor section.

In yet another variant, the transparent antenna includes a tenth rectangular conductor section that is connected with the ninth rectangular conductor section, the tenth rectangular conductor section being positioned between the ninth rectangular conductor section and the second dipole trace.

In yet another variant, the desired frequency band comprises a Wi-Fi frequency band.

In yet another variant, the feed connection includes a first dipole trace and the ground connection includes a second dipole trace, the first dipole trace being connected with a first angled conductor section that runs at a non-orthogonal angle with respect to a run length for the first dipole trace.

In yet another variant, the first angled conductor section further includes a triangle shaped conductor section, the triangle shaped conductor section being positioned between a distal end of the first angled conductor section and the first dipole trace, the distal end being positioned at an opposing end of the first angled conductor section from the first dipole trace.

In yet another variant, the second dipole trace is connected with a second angled conductor section, the second angled conductor section being oriented parallel with the first angled conductor section.

In yet another variant, the second angled conductor section is connected with a perpendicular conductor section, the perpendicular conductor section comprises a run length that is orthogonal with a run length of the second dipole trace.

In yet another variant, the perpendicular conductor section is connected with a first rectangular conductor section and a second rectangular conductor section, the first rectangular conductor section including a notched section disposed at an interface region between the first rectangular conductor section and the second rectangular conductor section, the notched section accommodating at least a portion of the first angled conductor section.

In another aspect, a transparent antenna assembly is disclosed. In one embodiment, the transparent antenna assembly includes a flexible transparent antenna having a transparent flexible substrate, the flexible transparent antenna being configured to operate according to a desired frequency band, the flexible transparent antenna including a portion that is configured to connect with a transparent substrate interface assembly; and a connector subassembly having a printed circuit board (PCB) mount connector, the PCB mount connector configured to interface with the transparent flexible substrate via the transparent substrate interface assembly, the connector subassembly further including a radio frequency (RF) connector, the RF connector being in signal communication with the PCB mount connector.

In one variant, the transparent substrate interface assembly includes a stiffener and one or more conductive pads, the stiffener being disposed on one side of the transparent flexible substrate when the connector subassembly is attached to the transparent flexible substrate, and the one or more conductive pads being disposed on an opposing side of the transparent flexible substrate from the stiffener.

In another variant, the transparent antenna assembly includes one or more carbon pads, the one or more conductive pads being disposed between the one or more carbon pads and the transparent flexible substrate when the connector subassembly is attached to the transparent flexible substrate.

In yet another variant, the transparent flexible substrate further includes a first dipole trace that comprises a driven element, and a second dipole trace that includes a ground element, the driven element and the ground element are in signal communication with the one or more conductive pads when the connector subassembly is attached to the transparent flexible substrate.

In yet another variant, the connector subassembly further includes a flex mount connector that is configured to interface with both the PCB mount connector as well as the transparent interface assembly.

In yet another aspect, a transparent substrate interface assembly is disclosed. In one embodiment, the transparent substrate interface assembly includes a stiffener and one or more conductive pads, the stiffener being disposed on one side of the transparent flexible substrate and the one or more conductive pads being disposed on a side of the transparent flexible substrate opposite from the stiffener.

Other features and advantages of the present disclosure will immediately be recognized by persons of ordinary skill in the art with reference to the attached drawings and detailed description of exemplary implementations as given below.

BRIEF DESCRIPTION OF THE DRAWINGS

The features, objectives, and advantages of the present disclosure will become more apparent from the detailed description set forth below when taken in conjunction with the drawings, wherein.

All Figures disclosed herein are @ Copyright 2023 Taoglas Group Holdings Limited. All rights reserved.

DETAILED DESCRIPTION

Exemplary Embodiments

Detailed descriptions of the various embodiments and variants of the apparatus and methods of the present disclosure are now provided. It is noted that wherever practicable similar or like reference numbers may be used in the figures and may indicate similar or like functionality. The figures depict embodiments of transparent FPCB antennas as well as exemplary systems that integrate these transparent FPCB antennas for purposes of illustration only. One skilled in the art will readily recognize from the following description that alternative embodiments of the structures and methods illustrated herein may be employed without necessarily departing from the principles described herein.

For example, while the various features discussed herein are primarily described in terms of a given frame of reference (e.g., top, bottom, left and right from a preestablished orientation), it would be readily apparent to one of ordinary skill given the contents of the present disclosure that this chosen frame of reference is arbitrary and other suitable descriptions in alternative frames of reference may be chosen to describe the various features of the transparent FPCB antenna structures described herein. Additionally, while various examples of antenna artwork for a transparent FPCB antenna implementation are shown herein in a specific orientation, it would be readily apparent to one of ordinary skill that one or more of the examples of the artwork shown herein may be reversed in alternative implementations without departing from the principles described herein. Moreover, while primarily discussed in the context of artwork manufactured onto FPCB flexible transparent substrates, it would be readily appreciated that in certain implementations this artwork may be disposed on alternative traditional PCB materials and/or ceramic based substrates. Finally, while primarily discussed in terms of specific antenna operating scenarios (e.g., cellular, GNSS and Wi-Fi operating scenarios), it would be readily apparent to one of ordinary skill given the contents of the present disclosure that the techniques described herein may be bodily incorporated into other antenna operating scenarios outside of these specific communication protocols and operating frequency bands.

Exemplary Transparent FPCB Antennas

Figure 1A:
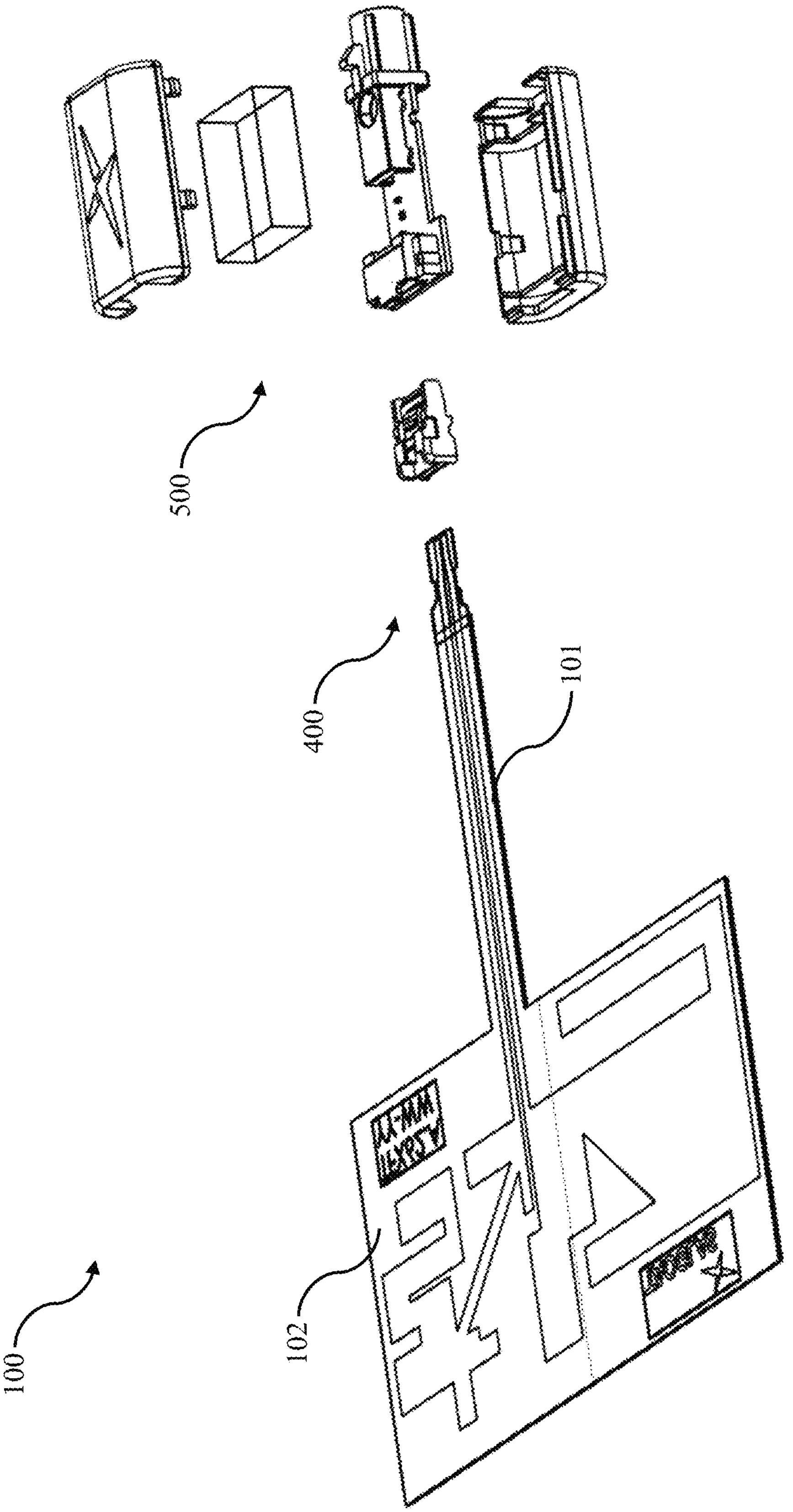
FIG. 1A is a perspective view of a transparent FPCB cellular antenna implementation, in accordance with the principles of the present disclosure.
Figure 1B:
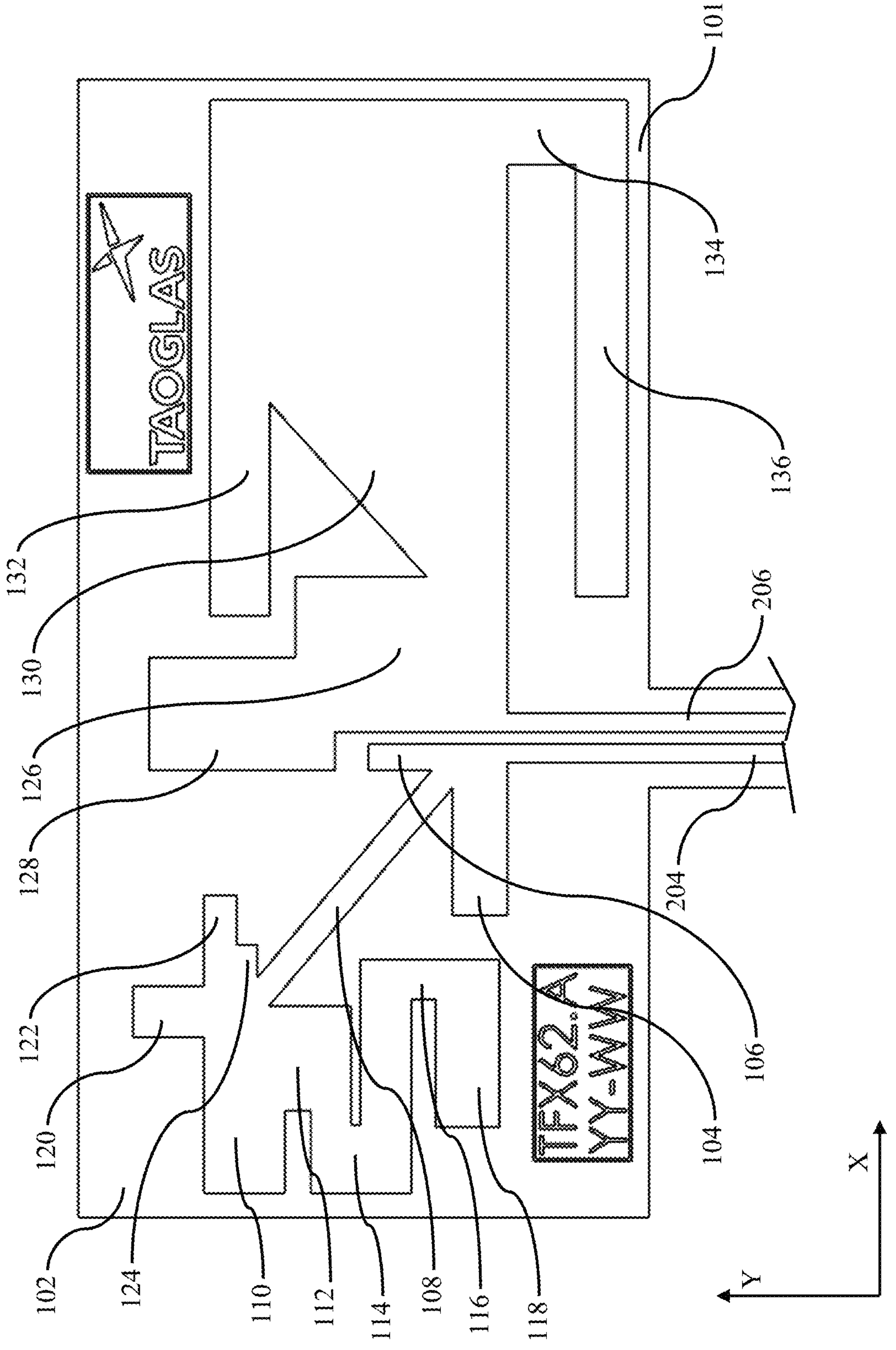
FIG. 1B is a front plan view of the FPCB antenna artwork for the cellular antenna implementation of FIG. 1A, in accordance with the principles of the present disclosure.
Figure 2A:
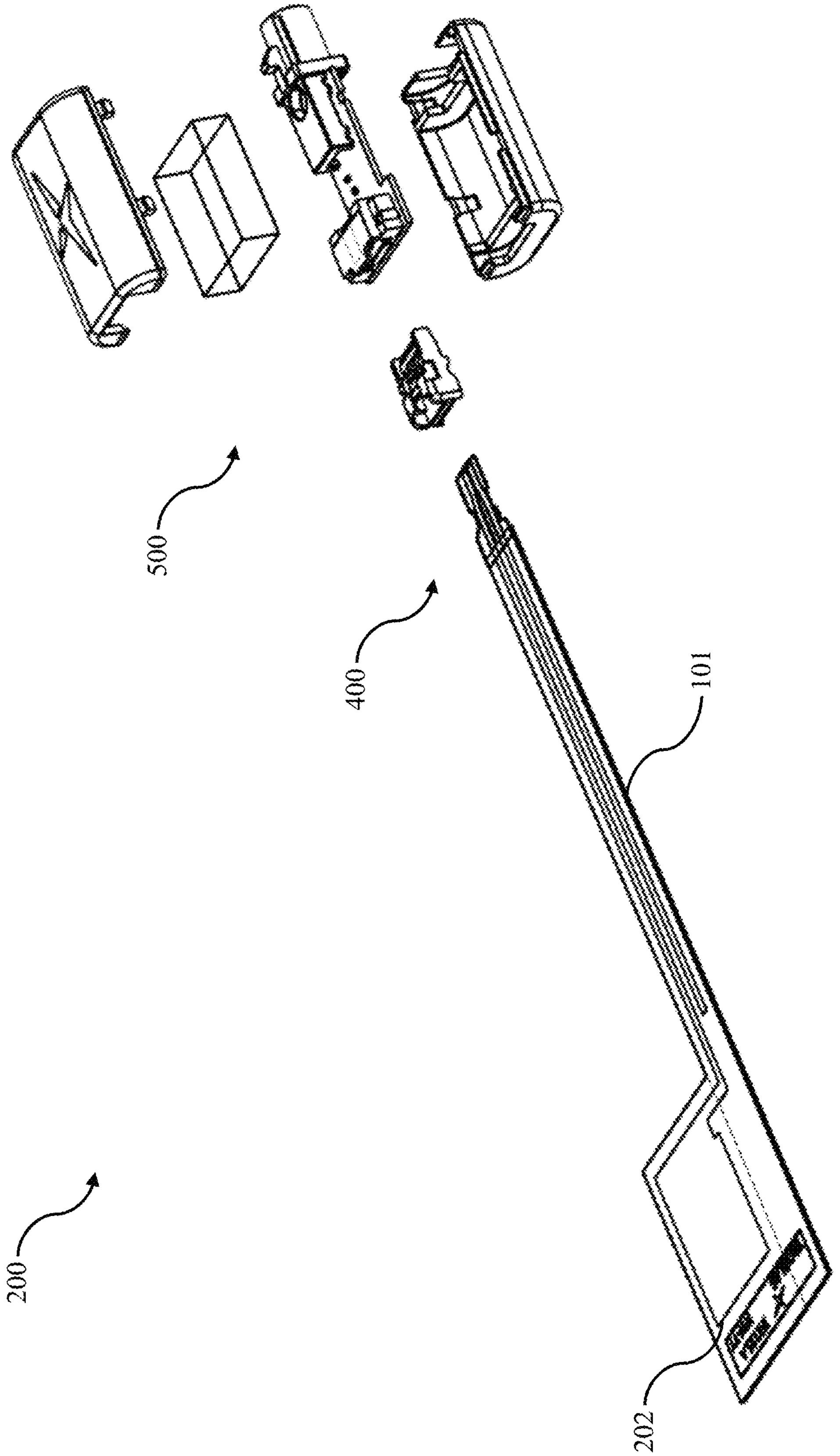
FIG. 2A is a perspective view of a transparent FPCB global navigation satellite system (GNSS) antenna implementation, in accordance with the principles of the present disclosure.
Figure 2B:
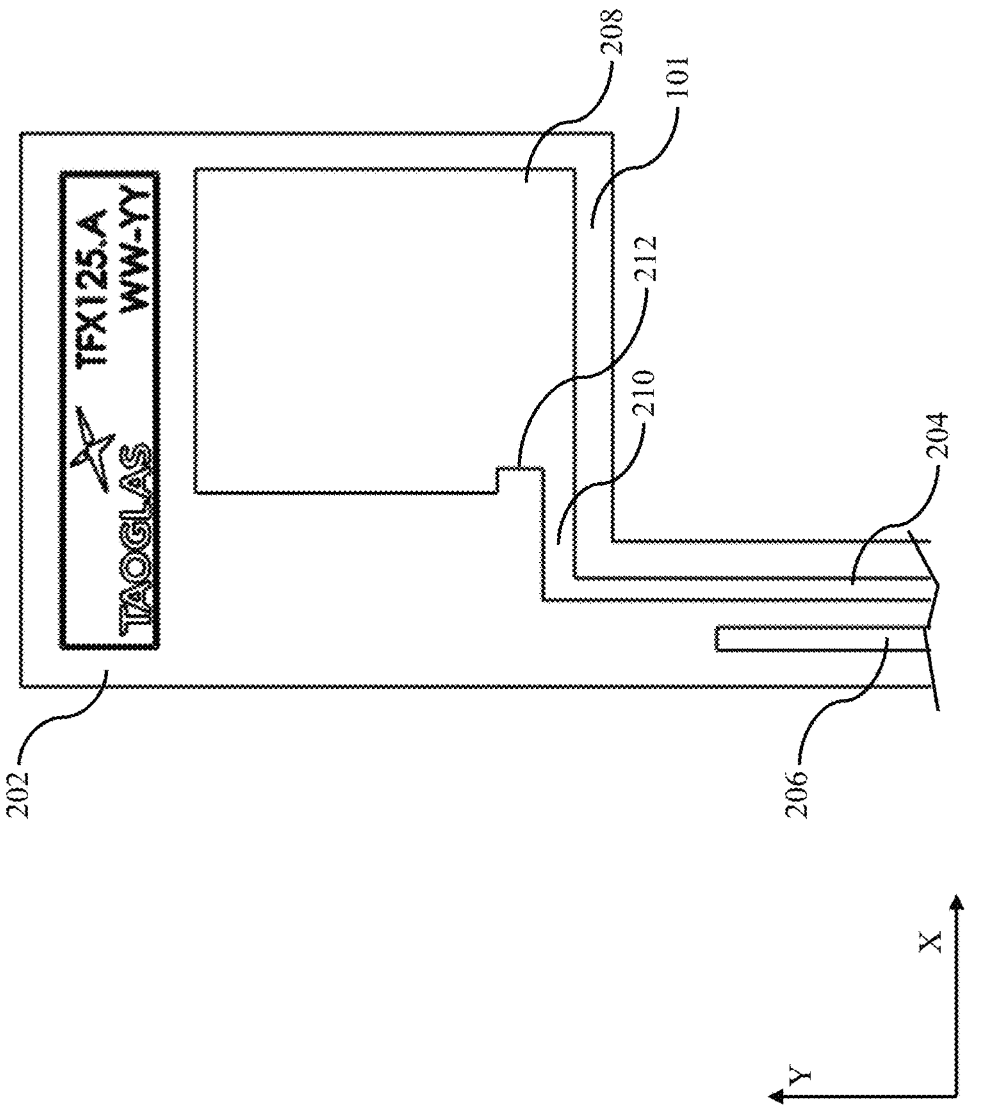
FIG. 2B is a front plan view of the FPCB antenna artwork for the GNSS antenna implementation of FIG. 2A, in accordance with the principles of the present disclosure.
Figure 3A:
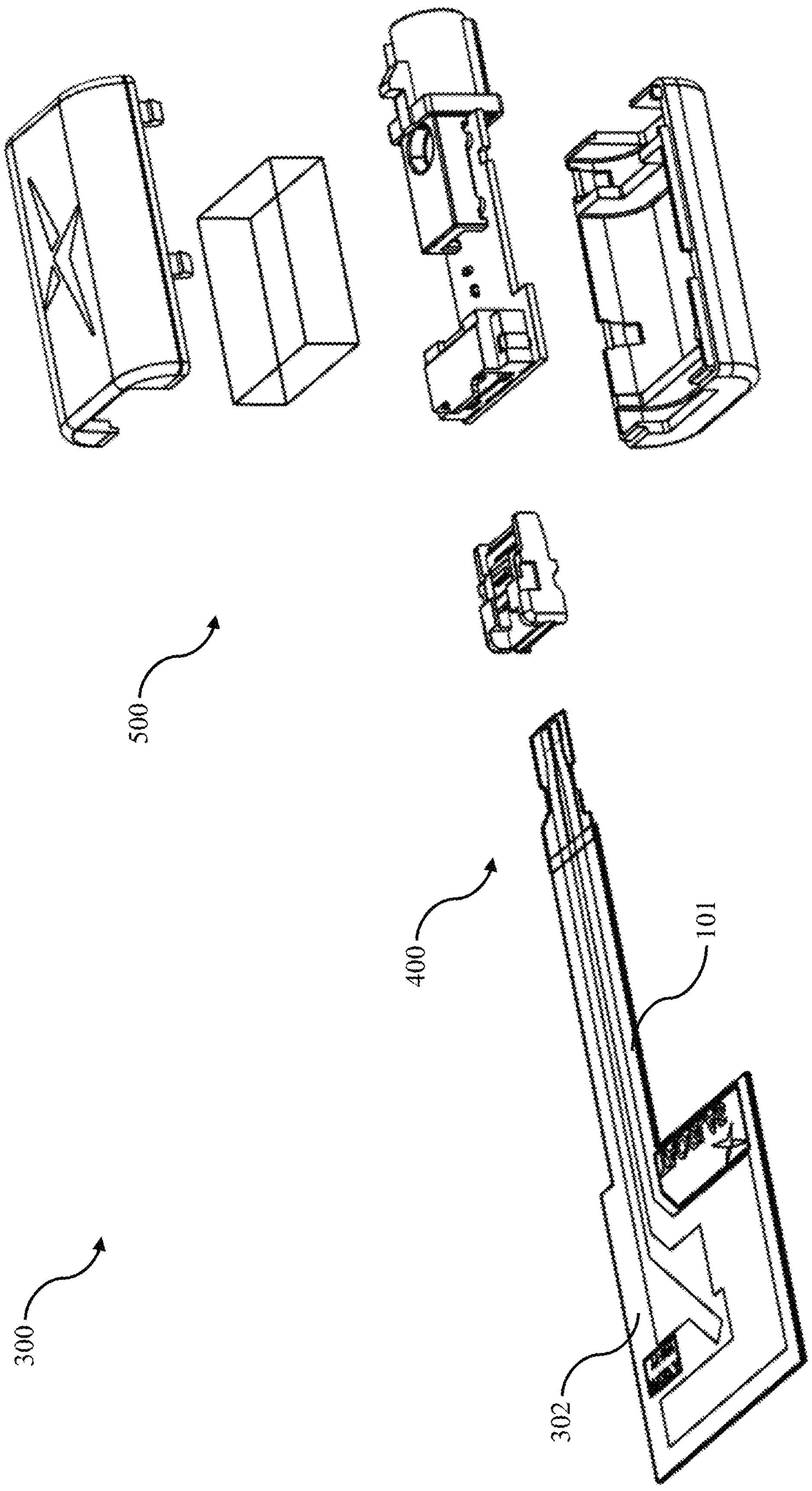
FIG. 3A is a perspective view of a transparent FPCB Wi-Fi antenna implementation, in accordance with the principles of the present disclosure.
Figure 3B:
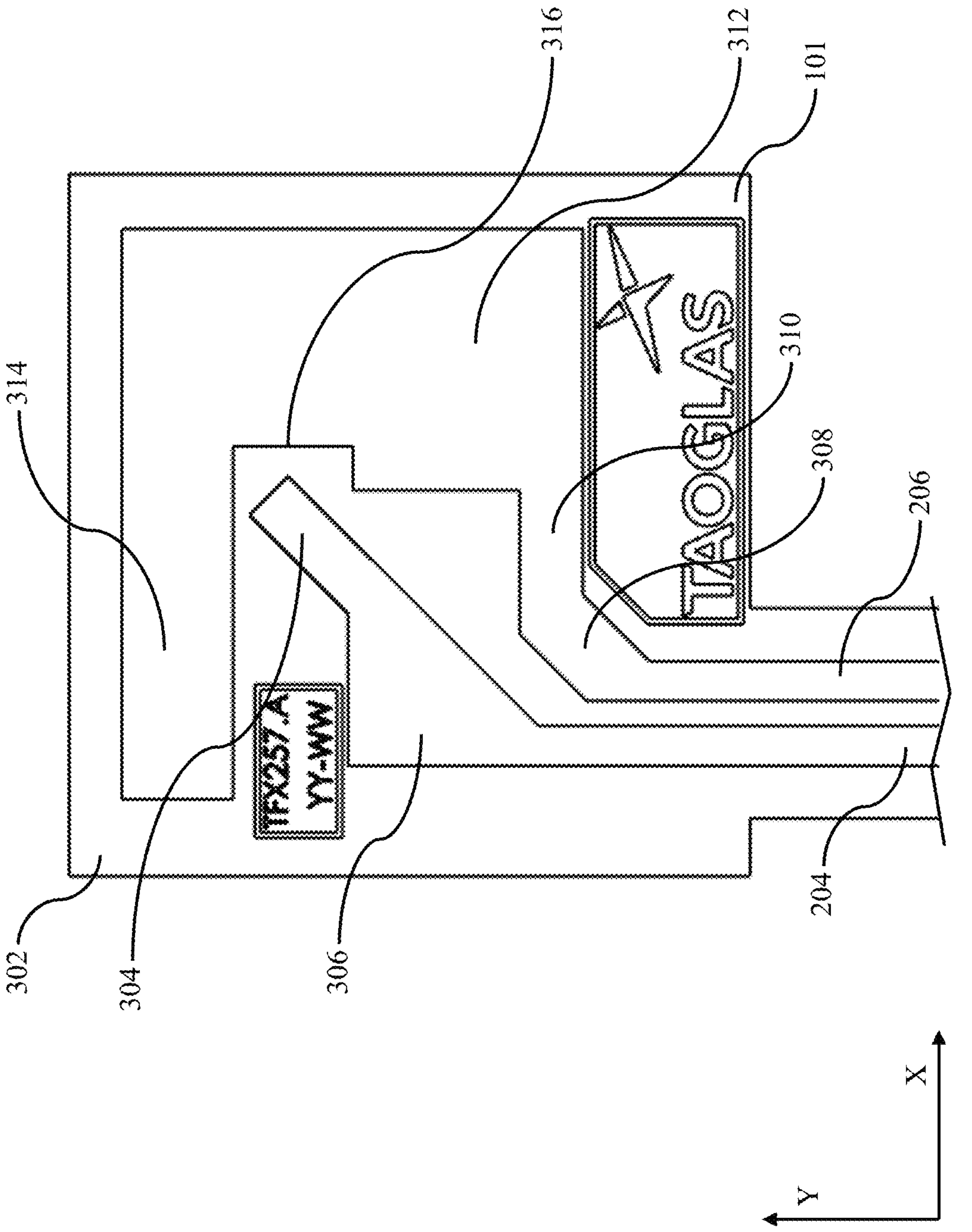
FIG. 3B is a front plan view of the FPCB antenna artwork for the Wi-Fi antenna implementation of FIG. 3A, in accordance with the principles of the present disclosure.

Referring now to FIGS. 1A-3B, various transparent FPCB antenna structures are shown and described in detail. Specifically, FIGS. 1A and 1B illustrate an exemplary cellular antenna 102 implementation, while FIGS. 2A and 2B illustrate an exemplary GNSS antenna 202 implementation, and FIGS. 3A and 3B illustrate an exemplary Wi-Fi antenna 302 implementation. Moreover, in each of the antenna implementations shown in FIGS. 1A-3B, these implementations may incorporate the same (or similar) transparent substrate interface assembly 400 shown and described with reference to FIG. 4. Additionally, in each of the antenna implementations shown with respect to FIGS. 1A-3B, these implementations may incorporate the same (or similar) connector subassembly 500 shown and described with reference to FIG. 5.

Referring now to FIG. 1A, a transparent antenna assembly 100 is shown and described in detail. Specifically, the transparent flexible substrate 101 has been configured for use as a transparent flexible cellular antenna 102. In some implementations, the transparent flexible substrate 101 may include an adhesive which enables the transparent flexible substrate to be secured to a variety of surfaces. The transparent antenna assembly 100 may also be configured for use with a connector subassembly 500. The use of the connector subassembly 500 may require adaptations to the transparent flexible substrate 101 itself, specifically inclusion of a transparent substrate interface assembly 400 (as is described infra with regards to FIG. 4) in some implementations. Referring now to FIG. 1B, the transparent flexible cellular antenna 102 is constructed as a dipole antenna. The transparent flexible cellular antenna 102 includes a first dipole trace 204 and a second dipole trace 206. The first dipole trace 204 may be a driven element also known as a feed, while the second dipole trace 206 may be connected to ground. As a brief aside, unlike traditional dipole antennas which are typically fed closer to the body of the radiating structures, the transparent flexible cellular antenna 102 illustrated includes a relatively long first dipole trace 204 and a relatively long second dipole trace 206 which places the connector subassembly (500, FIG. 1A) further away from the radiating structure of the antenna 102. One primary reason for this may be aesthetics. For example, the transparent portions of the transparent antenna assembly 100 may be disposed on, for example, glass on an automobile; while the non-transparent portions of the transparent antenna assembly 100 (e.g., the connector subassembly 500) may be hidden from view using, for example, body portions of the automobile. These and other implementation examples would be readily apparent to one of ordinary skill given the contents of the present disclosure.

Referring back to FIG. 1B, the side of the cellular dipole antenna 102 artwork that is connected with the first dipole trace 204 includes a horizontal projection conductor section 104 as well as a vertical projection conductor section 106. At the intersection of these two conductor sections 104, 106, an angled projection conductor section 108 is present that projects towards the upper left corner of the transparent flexible cellular antenna 102. The angled projection conductor section 108 ends at a first rectangular conductor section 110 that resides adjacent to the left-hand side of the transparent flexible cellular antenna 102. The angled projection conductor section 108 also ends at a vertical protruding conductor section 120, a horizontal protruding conductor section 122 and a smaller rectangular conductor section 124. The smaller rectangular conductor section 124 is positioned between the horizontal protruding conductor section 122 and the angled projection conductor section 108. Moving towards the bottom of the transparent flexible cellular antenna 102 from the first rectangular conductor section 110 is a second rectangular conductor section 112, a third rectangular conductor section 114, a fourth rectangular conductor section 116, and a fifth rectangular conductor section 118. The first, second, third, fourth and fifth rectangular conductor sections 110, 112, 114, 116, 118 together form a meandering conductor section from an end of the angled projection section 108 towards the bottom portion of the transparent flexible cellular antenna 102.

On the other side of the transparent flexible cellular antenna 102 that is connected with the second dipole trace 206 is a sixth rectangular conductor section 126 followed by a seventh rectangular conductor section 128. The seventh rectangular conductor section 128 is horizontally offset from the sixth rectangular conductor section 126 such that the left-hand edge of the seventh rectangular conductor section 128 is approximately collinear with the left-hand edge of the vertical projection conductor section 106 on the first dipole trace 204 side of the cellular flex antenna 102. To the right of the sixth rectangular conductor section 126 is an angled conductor section 130. An eighth rectangular conductor section 132 is disposed above the angled conductor section 130, while a tenth rectangular conductor section 136 is disposed below the angled conductor section 130. The tenth rectangular conductor section 136 is also spaced apart from the angled conductor section 130. The tenth rectangular conductor section 136 is connected with the angled conductor section 130 via a ninth rectangular conductor section 134. The ninth rectangular conductor section 134 is positioned near the bottom right corner of the transparent flexible cellular antenna 102. Collectively, each of these conductor sections form the radiating structure for the transparent flexible cellular antenna 102.

Referring now to FIG. 2A, another transparent antenna assembly 200 is shown and described in detail. Specifically, the transparent flexible substrate 101 has been configured for use as a transparent flexible GNSS antenna 202. In some implementations, the transparent flexible substrate 101 may include an adhesive which enables the transparent flexible substrate to be secured to a variety of surfaces. The transparent antenna assembly 200 may also be configured for use with a connector subassembly 500. The use of the connector subassembly 500 may require adaptations to the transparent flexible substrate 101, specifically inclusion of a transparent substrate interface assembly 400 (as is described infra) in some implementations. Referring now to FIG. 2B, the transparent flexible GNSS antenna 202 is constructed as a dipole antenna. The transparent flexible GNSS antenna 202, similar to the embodiment described with reference to FIGS. 1A and 1B, includes a first dipole trace 204 and a second dipole trace 206 with the first dipole trace 204 being a driven element also known as a feed, while the second dipole trace 206 is connected to ground. Also, similar to FIGS. 1A and 1B, the transparent flexible GNSS antenna 202 illustrated includes a relatively lengthy first dipole trace 204 and a relatively lengthy second dipole trace 206 which places the connector subassembly (500, FIG. 2A) further away from the radiating structure of the antenna 202.

As can be seen more clearly in FIG. 2B, the second dipole trace 206 is shorter in length than the first dipole trace 204. The first dipole trace 204 is also connected with other conductor sections, while the second dipole trace 206 is not connected with other conductor sections. The first dipole trace 204 ends at a rectangular feed section 210 that projects orthogonal to the run direction of the first dipole trace 204. The rectangular feed section 210 is connected with a rectangular conductor section 208. The rectangular conductor section 208 is larger in length in the Y-direction as compared with the X-direction. The rectangular conductor section 208 also includes a notched section 212 which is positioned in the lower left-hand corner of the rectangular conductor section 208. Collectively, these conductor sections (as well as the first dipole trace 204 and the second dipole trace 206) allow the transparent flexible GNSS antenna 202 to operate in GNSS frequency bands.

Referring now to FIG. 3A, yet another transparent antenna assembly 300 is shown and described in detail. Specifically, the transparent flexible substrate 101 has been configured for use as a transparent flexible Wi-Fi antenna 302. In some implementations, the transparent flexible substrate 101 may include an adhesive which enables the transparent flexible substrate to be secured to a variety of surfaces. The transparent antenna assembly 300 may also be configured for use with a connector subassembly 500. The use of the connector subassembly 500 may also require adaptations to the transparent flexible substrate 101, specifically inclusion of a transparent substrate interface assembly 400 (as is described infra) in some implementations. Referring now to FIG. 3B, the transparent flexible Wi-Fi antenna 302 is constructed as a dipole antenna. The transparent flexible Wi-Fi antenna 302, similar to the embodiment described with reference to FIGS. 1A and 1B, includes a first dipole trace 204 and a second dipole trace 206, with the first dipole trace 204 being a driven element also known as a feed, while the second dipole trace 206 is connected to ground. Also, similar to FIGS. 1A and 1B, the transparent flexible Wi-Fi antenna 302 illustrated includes a relatively long first dipole trace 204 and a relatively long second dipole trace 206 which places the connector subassembly (500, FIG. 3A) further away from the radiating structure of the antenna 302.

As can be seen in FIG. 3B, the first dipole trace 204 is connected with an angled conductor section 304. The angled conductor section 304 also includes a triangle shaped conductor section 306. The angled conductor section 304 also protrudes laterally in the X-direction towards the upper right corner of the transparent flexible Wi-Fi antenna 302 from the first dipole trace 204. The second dipole trace 206 section of the transparent flexible Wi-Fi antenna 302 is connected with an angled conductor section 308. The angled conductor section 308 protrudes in a direction that is generally parallel with the angled conductor section 304. The angled conductor section 308 also has a width that is greater than the width of the second dipole trace 206. A perpendicular conductor section 310 extends in a direction that is generally perpendicular to the run length of the second dipole trace 206. The perpendicular conductor section 310 also has a width that is approximately equal to the width of the angled conductor section 308. A first rectangular conductor section 312 is connected with the perpendicular conductor section 310 and may be disposed on a right-hand side of the transparent flexible Wi-Fi antenna 302. A second rectangular conductor section 314 is disposed adjacent to the top edge of the transparent flexible Wi-Fi antenna 302. The second rectangular conductor section 314 is larger in dimension in the X-direction as compared with the width of the second rectangular conductor section 314 in the Y-direction. A notched section 316 is disposed generally between the first rectangular conductor section 312 and the second rectangular conductor section 314. Collectively, these conductor sections (as well as the first dipole trace 204 and the second dipole trace 206) allow the transparent flexible Wi-Fi antenna 302 to operate in Wi-Fi frequency bands.

Exemplary Transparent Substrate Interface Assembly

Figure 4:
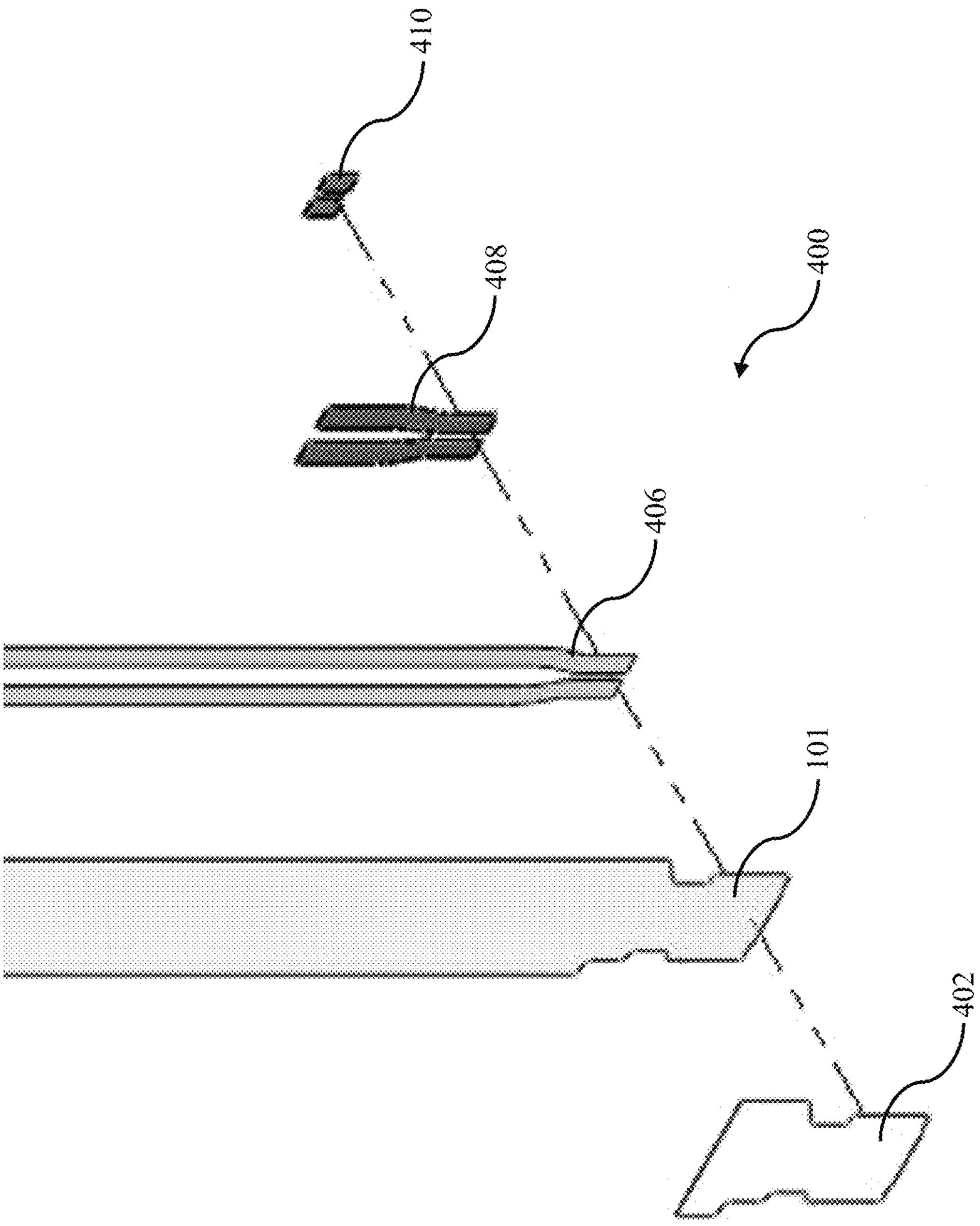
FIG. 4 is an exploded perspective view of the feed tab laminar structure of a transparent FPCB, in accordance with the principles of the present disclosure.

Referring now to FIG. 4, an exemplary transparent substrate interface assembly 400 is shown and described in detail. As discussed elsewhere herein, the exemplary transparent substrate interface assembly 400 may be utilized in conjunction with a flex mount connector (512, FIG. 5). This flex mount connector (512, FIG. 5) may be designed for use with typical FPCBs; however, its use with transparent FPCBs may require modification to the mechanical interface for the underlying transparent flexible substrate 101. Specifically, while the transparent FPCB may include a transparent flexible substrate 101 as well as antenna trace feeds 406 manufactured from, for example, the aforementioned transparent FPCB material manufactured by CHASM™, additional components may be necessary for the transparent substrate interface assembly 400 in order to be rendered suitable for use with the flex mount connector (512, FIG. 5). Specifically, a stiffener 402 may be incorporated on the opposing side of the transparent flexible substrate 101 from the antenna trace feeds 406, while clear conductive pads 408 and carbon pads 410 may be positioned over the antenna trace feed 406 side of the transparent flexible substrate 101. The stiffener 402 may include, for example, a relatively thin portion of FR-4 material (e.g., 5 mils thick) and an optically clear adhesive (OCA) with a thickness of 1 mil. The clear conductive pads may utilize, for example, LOCTITE® ECI 1010 which is a screen printable conductive ink made from silver. The carbon pads may be, for example, a carbon conductive composition such as DuPont® 7102. The use of these additional layers of material 402, 408, 410 may improve upon the reliability of the connection for the flex mount connector (512, FIG. 5D).

Exemplary Connector Subassembly

Figure 5:
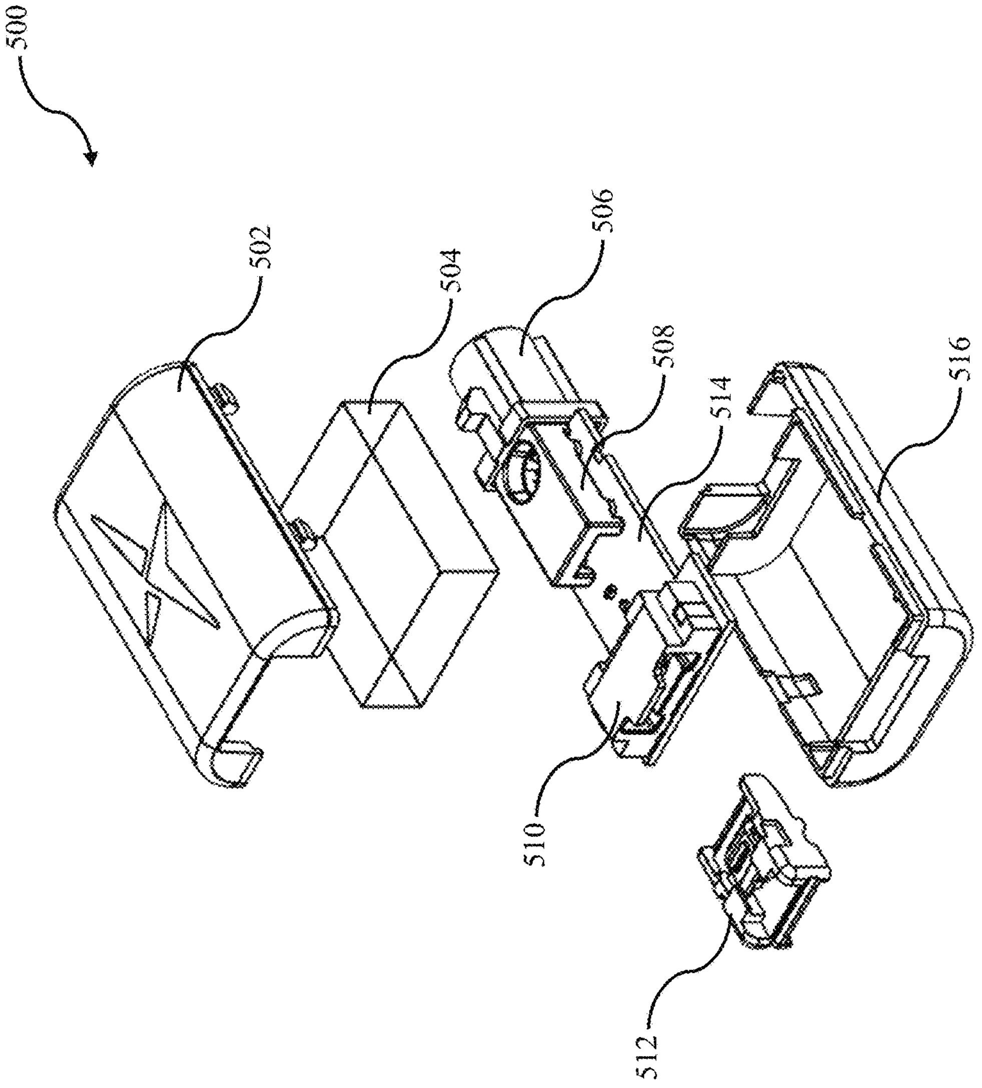
FIG. 5 is an exploded perspective view of an interface connector for use with a transparent FPCB, in accordance with the principles of the present disclosure.

Referring now to FIG. 5, a connector subassembly 500 for use with the aforementioned transparent antenna assemblies 100, 200, 300 is shown and described in detail. The connector subassembly 500 includes a flex mount connector 512 that is configured to interface with both the transparent flexible substrate 101 as well as the PCB mount connector 510. In some implementations, the flex mount connector 512 may constitute a cable plug jacket manufactured by Molex® having part number 505148, while the PCB mount connector 510 may constitute a right-angle PCT connector manufactured by Molex® having part number 505147. These Molex® connectors may typically be utilized for automotive connections and provide a robust reliable connection for an electrical circuit. In combination, these connectors 510, 512 may also allow for a FPCB to PCB interface that forms an electrical connection between, for example, the transparent flexible substrate 101 and the PCB 514. Additionally, the connector subassembly 500 enables the transparent antenna assemblies 100, 200, 300 to be installed in their end application without requiring additional tools or assembly techniques.

The PCB mount connector 510 may be mounted to a PCB 514. The PCB may have one or more electronic components disposed thereon. For example, these one or more electronic components may include impedance matching circuitry. This impedance matching circuitry may provide for, for example, impedance matching between the transparent antenna assemblies 100, 200, 300 and the RF connector 506. The PCB 514 may also include a RF connector to PCB interface 508 that is coupled with an RF connector 506. The connector subassembly 500 may also include a housing 502, 516. As illustrated in FIG. 5, the housing may include an upper housing 502 as well as a lower housing 516. The connector subassembly 500 may also include a foam block 504 which may be utilized to, inter alia, dampen vibrations exerted on the connector subassembly 500.

It will be recognized that while certain aspects of the present disclosure are described in terms of specific design examples, these descriptions are only illustrative of the broader methods of the disclosure and may be modified as required by the particular design. Certain steps may be rendered unnecessary or optional under certain circumstances. Additionally, certain steps or functionality may be added to the disclosed embodiments, or the order of performance of two or more steps permuted. All such variations are considered to be encompassed within the present disclosure described and claimed herein.

While the above detailed description has shown, described, and pointed out novel features of the present disclosure as applied to various embodiments, it will be understood that various omissions, substitutions, and changes in the form and details of the device or process illustrated may be made by those skilled in the art without departing from the principles of the present disclosure. The foregoing description is of the best mode presently contemplated of carrying out the present disclosure. This description is in no way meant to be limiting, but rather should be taken as illustrative of the general principles of the present disclosure. The scope of the present disclosure should be determined with reference to the claims.

What is claimed is:

1. A transparent antenna assembly comprising:

a flexible transparent antenna comprising a transparent flexible substrate, the flexible transparent antenna being configured to operate according to a desired frequency band, the flexible transparent antenna including a portion that is configured to connect with a transparent substrate interface assembly; and a connector subassembly comprising a printed circuit board (PCB) mount connector, the PCB mount connector configured to interface with the transparent flexible substrate via the transparent substrate interface assembly, the connector subassembly further comprising a radio frequency (RF) connector, the RF connector being in signal communication with the PCB mount connector;

wherein the transparent substrate interface assembly comprises a stiffener and one or more conductive pads, the stiffener being disposed on one side of the transparent flexible substrate when the connector subassembly is attached to the transparent flexible substrate, and the one or more conductive pads being disposed on an opposing side of the transparent flexible substrate from the stiffener; and one or more carbon pads, the one or more conductive pads being disposed between the one or more carbon pads and the transparent flexible substrate when the connector subassembly is attached to the transparent flexible substrate.

2. The transparent antenna assembly of claim 1, wherein the transparent flexible substrate further comprises a first dipole trace that comprises a driven element, and a second dipole trace that comprises a ground element; and wherein the driven element and the ground element are in signal communication with the one or more conductive pads when the connector subassembly is attached to the transparent flexible substrate.

3. The transparent antenna assembly of claim 2, wherein the connector subassembly further comprises a flex mount connector that is configured to interface with both the PCB mount connector as well as the transparent substrate interface assembly.

4. A transparent antenna assembly comprising:

a flexible transparent antenna comprising a transparent flexible substrate, the transparent flexible substrate comprises conductive artwork disposed thereon, the conductive artwork comprising a feed connection and a ground connection, the flexible transparent antenna being configured to operate according to a cellular frequency band, the flexible transparent antenna including a portion that is configured to connect with a transparent substrate interface assembly; and a connector subassembly comprising a printed circuit board (PCB) mount connector, the PCB mount connector configured to interface with the transparent flexible substrate via the transparent substrate interface assembly, the connector subassembly further comprising a radio frequency (RF) connector, the RF connector being in signal communication with the PCB mount connector;

wherein the transparent flexible substrate comprises a first rectangular portion and a second rectangular portion, the first rectangular portion comprising a first length dimension and a first width dimension and the second rectangular portion comprising a second length dimension and a second width dimension, the second length dimension being larger in size than the first length dimension and the first width dimension being larger in size than the second width dimension, the connector subassembly is coupled with the second rectangular portion of the transparent flexible substrate; and wherein the feed connection comprises a first dipole trace, the first dipole trace being connected with a horizontal projection conductor section and a vertical projection conductor section, the horizontal projection conductor section being positioned orthogonal with the vertical projection conductor section, the first dipole trace further being connected with an angled projection conductor section that is disposed at an interface region between the horizontal projection conductor section and the vertical projection conductor section.

5. The flexible transparent antenna of claim 4, wherein the angled projection conductor section is connected with a meandering conductor section at an end of the angled projection conductor section that is opposite from the interface region between the horizontal projection conductor section and the vertical projection conductor section.

6. The flexible transparent antenna of claim 5, wherein the ground connection comprises a second dipole trace, the second dipole trace being connected with a sixth rectangular conductor section followed by a seventh rectangular conductor section, the sixth rectangular conductor section being disposed between the second dipole trace and the seventh rectangular conductor section, the seventh rectangular conductor section being horizontally offset from the sixth rectangular conductor section, the sixth rectangular conductor section also being disposed adjacent the first dipole trace;

wherein an angled conductor section is connected with the sixth rectangular conductor section, the angled conductor section also being connected with an eighth rectangular conductor section on one end of the angled conductor section, the angled conductor section also being connected with a ninth rectangular conductor section on an opposing end of the angled conductor section opposite from the one end of the angled conductor section.

7. The flexible transparent antenna of claim 6, further comprising a tenth rectangular conductor section that is connected with the ninth rectangular conductor section, the tenth rectangular conductor section being positioned between the ninth rectangular conductor section and the second dipole trace.

8. The transparent antenna assembly of claim 7, wherein the transparent substrate interface assembly comprises a stiffener and one or more conductive pads, the stiffener being disposed on one side of the transparent flexible substrate when the connector subassembly is attached to the transparent flexible substrate, and the one or more conductive pads being disposed on an opposing side of the transparent flexible substrate from the stiffener.

9. The transparent antenna assembly of claim 8, further comprising one or more carbon pads, the one or more conductive pads being disposed between the one or more carbon pads and the transparent flexible substrate when the connector subassembly is attached to the transparent flexible substrate.

10. The transparent antenna assembly of claim 9, wherein the transparent flexible substrate further comprises a first dipole trace that comprises the feed connection, and a second dipole trace that comprises the ground connection; and wherein the feed connection and the ground connection are in signal communication with the one or more conductive pads when the connector subassembly is attached to the transparent flexible substrate.

11. The transparent antenna assembly of claim 10, wherein the connector subassembly further comprises a flex mount connector that is configured to interface with both the PCB mount connector as well as the transparent substrate interface assembly.

12. The transparent antenna assembly of claim 4, wherein the transparent substrate interface assembly comprises a stiffener and one or more conductive pads, the stiffener being disposed on one side of the transparent flexible substrate when the connector subassembly is attached to the transparent flexible substrate, and the one or more conductive pads being disposed on an opposing side of the transparent flexible substrate from the stiffener.

13. The transparent antenna assembly of claim 12, further comprising one or more carbon pads, the one or more conductive pads being disposed between the one or more carbon pads and the transparent flexible substrate when the connector subassembly is attached to the transparent flexible substrate.

14. The transparent antenna assembly of claim 13, wherein the first dipole trace comprises a driven element, and the second dipole trace comprises a ground element; and wherein the driven element and the ground element are in signal communication with the one or more conductive pads when the connector subassembly is attached to the transparent flexible substrate.

15. The transparent antenna assembly of claim 14, wherein the connector subassembly further comprises a flex mount connector that is configured to interface with both the PCB mount connector as well as the transparent substrate interface assembly.

* * * * *